United States Patent

[11] 3,559,981

[72] Inventor Harold R. Abshear
 1520 W. Silliker, La Habra, Calif. 90631
[21] Appl. No. 716,180
[22] Filed Mar. 26, 1968
[45] Patented Feb. 2, 1971

[54] DIFFERENTIAL HANDLING TOOL
 3 Claims, 4 Drawing Figs.
[52] U.S. Cl. ..................................... 269/130,
 254/134; 269/296
[51] Int. Cl. ..................................... B25b 5/14
[50] Field of Search........................................... 269/130,
 131, 132, 296, 104, 321N; 254/43 (Cursory), 37
 (Cursory), 134; 248/361A

[56] References Cited
 UNITED STATES PATENTS
 568,543  9/1896  Parks............................ 269/131X
 1,556,882  5/1925  Weaver........................ 269/296X Primary Examiner—Andrew R. Juhasz
Assistant Examiner—Leon Gilden
Attorney—J. Carroll Baisch

ABSTRACT: A motor vehicle differential supporting and holding apparatus having adjustable differential flange holders and a neck rest for positioning under the differential neck. A chain secures the neck on the neck rest and is tightened by means of a turnbuckle.

PATENTED FEB 2 1971

3,559,981

Harold R. Abshear.
INVENTOR.

BY J. C. Baisch

Attorney 3,559,981

1

DIFFERENTIAL HANDLING TOOL

BACKGROUND OF THE INVENTION

1 Field of Invention

The invention relates generally to garage equipment or apparatus for holding, supporting, and controlling differential units of motor vehicles during removal of such units for servicing, repair, or replacement of such units, and installation or replacement thereof and while the invention has particular utility embodied in apparatus for holding, supporting and controlling differential units of motor vehicles, and is shown and described thus embodied, it is to be understood that its utility is not confined thereto.

2 State of the Prior Art and the Problems Thereof Solved by the Present Invention There are various types of apparatus or mechanisms for handling various units of motor vehicles, including differential units. However, these mechanisms, as far as I am aware, are complicated in construction, and the mounting and handling of differential units thereon is difficult and time consuming so that labor costs are correspondingly high. Further, at least some of such prior art mechanisms require a number of bolts or screws and nuts for retaining various parts in holding position after adjustments have been made.

BRIEF SUMMARY OF THE INVENTION

The present invention comprises a flat base plate at one end of which are a pair of differential flange holders that are adjustable laterally toward and away from each other to accommodate the flanges of various sizes and types of differentials.

There is a differential neck support having a base, an upstanding tubular post in which an externally threaded shaft is telescopically slidable, said shaft having an adjustment nut thereon which rests on the upper end of the tubular post. A differential neck rest is carried by said shaft at the upper end thereof.

A chain provides the means for securing the neck of a differential on the differential neck rest. One end of the chain is hooked to the plate at one side thereof, the other end of said chain being provided with a turnbuckle secured to the other side of the plate for adjusting the tightness of the chain.

The neck support means is not attached to the base plate but is loose thereon so that it can be moved about on said base plate to any desired spot thereon. Thus an infinite and very accurate positioning of the neck is possible to meet any condition that may be encountered in mounting a differential on the apparatus.

OBJECTS AND ADVANTAGES OF THE INVENTION

It is an a object of the invention to provide differential handling, supporting and controlling apparatus that will solve the problems of the prior art and overcome the difficulties thereof.

It is another object of the invention to provide apparatus of this character that will facilitate the handling of motor vehicle differential units.

It is still another object of the invention to provide apparatus of this character that is simple in construction and operation.

A further object of the invention is to provide apparatus of this character that is easy to operate.

It is a still further object of the invention to provide apparatus of this character that may be operated easily by one man.

Another object of the invention is to provide apparatus of this character that takes a minimum of the time required to handle differential units.

Still another object of the invention is to provide apparatus of this character that minimizes the cost of handling such units.

A further object of the invention is to provide apparatus of this character that is safe to use and to operate.

2

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

Referring to the drawings, which are for illustrative purposes only:

Figure 1:
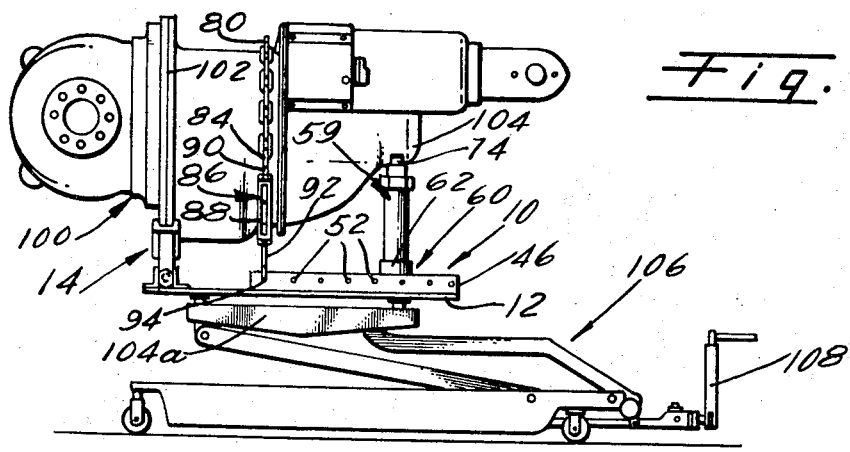
FIG. 1 is a side elevational view of a differential tool embodying the present invention, a differential being mounted on the tool with the latter mounted on a jack.
Figure 2:
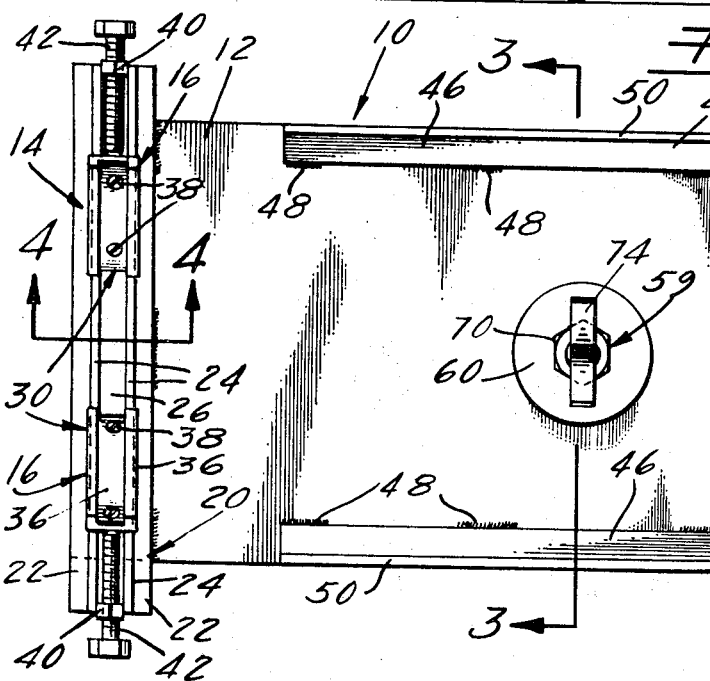
FIG. 2 is an enlarged top plan view of the differential handling tool.

Referring more particularly to the drawings, there is shown a differential handling tool, indicated generally at 10. The tool comprises a support base plate 12, adjacent one end of which is an adjustable differential flange holder, indicated generally at 14. The base plate may, of course, be of any suitable size, depending on the differential to be handled.

At said one end of the base plate 12 is guide means for differential flange receiving members or means, indicated generally at 16, and comprising a pair of transversely extending parallel angle members or angle irons, indicated generally at 20, which are spaced laterally apart relative to each other. The horizontal parts 22 of said angle members are secured to the base plate by welding, brazing or other suitable means so that the upstanding vertical portions 24 of said angle members define a space 26 therebetween in which is slidably disposed the lower edge portions of generally triangular body plates 28 of differential flange receiving members, indicated generally at 30.

Figure 4:
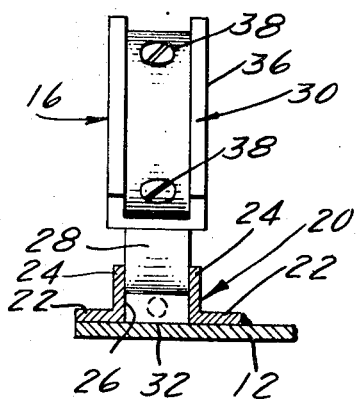
FIG. 4 is an enlarged sectional view taken on line 4—4 of FIG. 2.

The base 32, FIG. 4, of each triangular body plate 28 is disposed in the guide space 26 and on the base plate 12, while the hypotenuse or inclined side 34 of each of said body plates 28 faces toward the longitudinal center of the base plate 12 so that said inclined sides 34 are oppositely arranged. On the inclined side 34 of each of the body plates 28 is a channel member 36 secured to said inclined side by screws 38 or other suitable means. The body plates 28 are held in the guide space by their own weight and the weight of the differential when disposed in the channel members 36.

At each end of the guide means is a nut 40 which is disposed between the upstanding parts 24 of the angle members 20 and welded thereto. It is to be that the angle members of guide means extend outwardly of the respective adjacent edges of the base plate 12 in order to permit the flange receiving members 30 to have a maximum range of adjusting movement. An adjustment bolt 42 is provided for each nut and has a multisided head for engagement by an actuating wrench or other suitable tool.

Along each side of the base plate 12 is an angle member or angle iron 46 with the horizontal part, as at 48, welded to the base plate, the upstanding part 50 of the angle members being adjacent the respective side edges of the base plate. These upstanding parts 50 of the angle members 46 have a plurality of longitudinally spaced holes 52 therein, the holes of the part 50 of one of the angle irons 46 being in alignment with respective corresponding holes in the part 50 of the other angle iron or member.

The differential handling tool includes a differential neck support, or neck support means, indicated generally at 59, having a base, indicated generally at 60, with an internally threaded upstanding socket 62, which may be integral with the base or may be a separate part welded or otherwise secured to the base.

There is a neck post which comprises an external hollow tubular post member 66 having one end externally threaded and screwed into the socket 62. An internal neck post member 68 that is externally threaded and slidable within the external post member 66. Threaded on the internal post member 68 is a nut 70 which rests on the upper end of the external post member 66. Rotation of the nut 70 effects upward or downward telescoping movement of the inner post member 68, depending upon the direction of rotation of said nut. At the upper end of the internal post a differential neck rest 74 is secured by welding 76 or other suitable means. This neck rest 74 is in the shape of a wide V.

There is also means for securing a differential neck on the neck rest which comprises a hold down means such as a chain 80, for example. There is an S hook 82 at one end of the chain which is adapted to be hooked into the holes 52 of one of the angle members or angle irons. The other end of the chain 80 is linked onto an eye 84 of a turnbuckle, indicated generally at 86. The turnbuckle is of well known character. The central O-shaped part or link 88 fits into a tapped opening at one end of which the shank 90 of the eye 84 is screwed. The externally threaded shank 92 of a hook 94 is screwed into a tapped opening at the other end of the O-shaped link 88, said hook 94 being adapted to be hooked into or through openings 52 in the upstanding part 50 of the angle member 46 at the opposite side of the base plate 12. In the turnbuckle shown the screw threads of the eye shank 90 and the hook shank 92 are of opposite hand and the tapped openings at the ends of the link 88 are of respective corresponding hand so that rotation of the link 88 will effect tightening or loosening of the chain 80, depending on the direction of rotation of said link 88.

A differential referred to herein is the differential used in motor vehicles. Sometimes they are called third members or rear ends. It is generally indicated at 100, FIG. 1.

Figure 3:
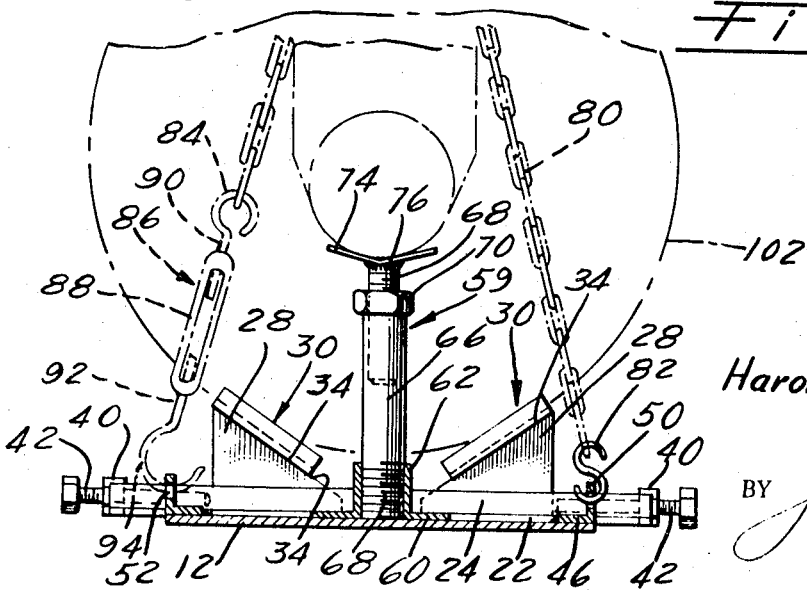
FIG. 3 is a sectional view taken on line 3—3 of FIG. 2.

For servicing and/or repair or replacing the differential assembly it must be removed from its housing or case. On each differential there is a flange 102 that butts up against the housing or case and is held securely in place with bolts and nuts. This flange is adapted to be received in the channel members 36 of the flange receiving members 30, as best shown in FIGS. 1 and 3.

The differential extends forwardly from the flange 102 for various distances, depending on the size and type of differential which, of course, vary with different makes and models. This forwardly extending part of the differential is known as the housing neck, which is indicated at 104.

When using the present apparatus or differential handling tool, it is placed on the platform 104a of a jack, indicated generally at 106. Any suitable jack may be used, such jacks being of well known character and hence need not be described in detail. It is sufficient to state that turning of the crank 108 of the jack effects raising or lowering of the platform 104.

Assuming the differential handling tool is properly positioned under the differential to be removed from the vehicle, the platform is raised until the flange 102 of the differential is disposed in the channel members 36 or is in alignment therewith. Adjustment of the screws 42 will, of course, adjust the flange receiving members 30 for proper reception and retention of the flange.

The differential neck support 59 is loosely disposed in the base plate 12 and is positioned beneath the neck by moving said support 59 about on the base plate 12 to position the neck rest 74 beneath the neck. Rotation of the nut 70 adjusts the inner post member 68 to the right height to properly support the neck.

With the differential neck rest in place and adjusted, the hold down chain is placed over the differential neck between the neck rest and the differential flange holding means or flange holder 14. The S hook at one end of the chain is inserted into an aligned hole 52 in one of the angle members 46 and the hook of the turnbuckle inserted into a corresponding hole in the angle member at the opposite side of the base plate 12. The O-shaped link 88 is then turned to draw the chain tightly.

The differential is then disconnected from the vehicle in the usual manner and lowered by turning the crank 108. After the differential has been serviced, it is replaced by reversing the procedure above described.

Various lengths of internal posts 68 may be used, depending on the situation involved.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims.

I claim:

1. A differential handling tool for differentials having a flange thereon and a neck spaced in longitudinally therefrom:
   A. a support plate;
   B. a flange receiving means for said support plate;
   C. neck support means on the support plate;
   D. hold down means for securing the differential on the flange receiving and supporting means and the neck rest means;
   E. the flange receiving means including a pair of members extending laterally of the base plate and having oppositely arranged recesses for reception of the differential flange;
   F. said members comprising vertical, generally triangular body plates having their hypotenuse sides facing toward each other and the longitudinal center of the support plate; and
   G. and a channel member secured to the hypotenuse side of each body plate, said channel members defining the recesses for reception of the differential flange.

2. The invention defined by claim 1, including guide means defining a guide channel in which the bases of the triangular body plates are received and in which said body plates are adapted to slide toward and away from each other; and means for adjusting said body plates relative to each other.

3. A differential handling tool for differentials having a flange thereon and a neck spaced longitudinally therefrom:
   A. a support plate;
   B. flange receiving means for said support plate;
   C. neck support means on the support plate;
   D. hold down means for securing the differential on the flange receiving and supporting means and the neck rest means;
   E. said hold down means comprising an elongated flexible element having its ends connected to respective sides of the base plate and adapted to extend over a differential disposed on the flange receiving means and the neck support means; means for adjusting the effective length of the hold down means;
   F. there being a longitudinally extending side member along at least a portion of each side of the support plate, said longitudinally extending members having holes therein the holes of one of said members being aligned with corresponding holes in the other of said members; said elongated flexible element comprising a chain; hooks at the ends of said chain adapted to be hooked into holes of said side members; and
   G. a turnbuckle for tightening and loosening said chain.